United States Patent [19]
Baues

[11] 3,764,936
[45] Oct. 9, 1973

[54] LASER ARRANGEMENT FOR CREATING A STABLE PULSE WITH SHORT PULSE SPACINGS
[75] Inventor: Peter Baues, Krailling, Germany
[73] Assignee: Siemens Aktiengesellschaft, Berlin and Munich, Germany
[22] Filed: Apr. 19, 1972
[21] Appl. No.: 245,326

[30] Foreign Application Priority Data
June 25, 1971 Germany................... P 21 31 615.4

[52] U.S. Cl. .............................................. 331/94.5
[51] Int. Cl. ............................................. H01s 3/10
[58] Field of Search.................. 331/94.5; 350/160

[56] References Cited
UNITED STATES PATENTS
3,559,102   1/1971   Ueki .................................. 331/94.5
3,473,030  10/1969   Mevers et al. ..................... 331/94.5
3,651,424   3/1972   Ueno et al. ........................ 331/94.5
3,628,173  12/1971   Danielmeyer...................... 331/94.5

Primary Examiner—William L. Sikes
Attorney—Benjamin H. Sherman et al.

[57] ABSTRACT

A laser arrangement for creating a stable pulse with short pulse spacings, comprising an active laser medium, a modulator, a mode selector and an optical resonator, wherein the mode selector is an optical filter for a mode group.

10 Claims, 10 Drawing Figures

LASER ARRANGEMENT FOR CREATING A STABLE PULSE WITH SHORT PULSE SPACINGS

BACKGROUND OF THE INVENTION

1. Field of the Invention

This invention relates to a laser arrangement for creating a stable pulse with short pulse spacings, and more particularly to such a laser arrangement which comprises an active laser medium, a modulator, a mode selector and an optical resonator.

2. Description of the Prior Art

A laser pulse is employed to transmit communications in the form of pulse code modulation. Inasmuch as the amount of information which can be transmitted is inversely proportional to the pulse spacing, lasers are required which create a pulse with very short pulse spacings. In addition, the pulse is to be emitted in a very stable manner.

A pulse emitting laser generally contains either a passive modulator or an active modulator. A laser beam which is introduced into the modulator generally effects an energy exchange between the axial modes of the laser resonator. Since the distance $t_o$ between two pulses depends on the optical length $L$ of the resonator ($2L/c = t_o$), a modulation signal with a pulse recurrence frequency $f_o = c/2L$ must be introduced. Therefore, high pulse recurrence frequencies can be attained through the use of short resonator length $L$; however, this influences the initial performance of the laser.

The pulse recurrence frequency can be increased in modulating in the modulator with a submultiple m of the frequency $f_o = c/2L$. If the modulator is operated with a frequency $f_1 = mc/2L$, energy can only be exchanged between modes having the pulse recurrence frequency spacing $f_1 = mc/L$. Therefore, m pulse lines are created with the pulse spacings $1/f_1$ which are not coupled with each other so that a highly unstable total pulse is achieved.

Another method for producing a higher pulse recurrence frequency is described in the German Offenlegungsschrift Pat. No. 1,816,337. In that disclosure coupled optical resonators are employed. However, the arrangement disclosed in this Offenlegungsschrift has the effect that the axial modes of a laser at a distance $mc/2L$ show only slightly lower losses than the other axial modes, where $L$ in this case is the length of the main resonator, $c$ is the speed of light and m is an integral number. Since the second resonator is only slightly coupled to the main resonator, again an unstable pulse is created since several mode groups can oscillate, which means that several groups are intercoupled with the frequency distances $f_1 = mc/2L$, the individual groups having no connection with each other.

SUMMARY OF THE INVENTION

It is therefore the task of the present invention to provide a laser arrangement for creating, in a stable manner, a pulse with a high pulse recurrence frequency.

According to the invention, the foregoing task is realized through the provision of an optical filter in a laser arrangement as a mode selector for only one mode group. Preferably, an interferometer may advantageously be employed at an optical filter which shows transmission ranges in the frequency spacing $\Delta\gamma_1$ of an integral multiple of the frequency spacing of the axial modes. Any arrangement which creates several beams which are capable of interfering with each other from one incident laser beam may serve as an interferometer. In most cases the simplest form of interferometer is a quartz block.

The filtering process by means of the interferometer can be best explained as follows. A light pulse, incident in the interferometer, is reflected several times in the interior of the interferometer. During each reflection, a pulse is emitted from the exit of the interferometer. Therefore, several successive pulses are created from a single incident pulse. If the distance of two subsequent pulses is m times the interferometer thickness (m = natural number), the pulse spacing amounts to $1/m$-tel of the original. However, an increased pulse recurrence frequency means a decreased mode number. By means of a certain thickness of the interferometer material, depending on the incident pulse recurrence frequency, a definite number of modes may be filtered from the available number of modes, e.g. of three successive modes the second and third are filtered.

In order to avoid disturbances of the laser operation, the light which is reflected at the interferometer should not return into the amplifying medium. Preferably, this is attained through the provision of an optical system which is disposed between the active laser medium and the interferometer to filter the reflected light from the interferometer. An embodiment of such filtering by an optical system will be explained in detail below.

For the purpose of modulating the light, a phase modulator or an amplitude modulator is especially employed. This modulator may be controlled either by an external frequency generator or by the emitted laser light itself. In the case of the latter, undesired misalignments of the interferometer and the entire laser resonator, or imperfect stability of the frequency of an external frequency generator are obviated and no longer lead to disturbances in laser operation.

It is also advantageous if the modulator has light entry and light exit surfaces which are inclined at the Brewster angle. Therefore, undesired Etalon effects are avoided.

It is also advantageous to provide a device for changing the resonator length for an automatic matching of the frequencies of the axial modes with the maximum of the transmission ranges of the interferometers. For this purpose, a first piezoelectric disc is arranged particularly at one of the resonator mirrors for a non-periodic changing of the resonator length by charging the disc with a direct voltage, and by arranging a subsequent second piezoelectric disc at the first disc for periodically changing the resonator length by charging the same with an alternating voltage at a frequency $f_2$ to determine the above mentioned frequency matching. Furthermore, an external frequency generator is employed with a constant frequency $f_2$, which controls the second piezoelectric disc. In addition, an optical-electrical receiver which demodulates the emitted radiation, a filter which allows only the frequency $f_2$ to pass and a control device which creates a change in the direct voltage only if controlled by the frequency $f_2$ are employed. The automatic matching of the frequencies of the axial modes with the maximum of the transmission ranges of the interferometers takes place in that the second piezoelectric disc is controlled by the external frequency generator with the constant frequency $f_2$, whereby the axial modes are modulated with the frequencies $f_2$ because of the periodic changing of the resonator length if the frequencies of the axial modes do not coincide with the maximum of the transmission ranges. The axial modes are modulated with the frequency $2f_2$ if the frequencies of the axial modes coincide with the maxima of the transmission ranges. The optical-electrical receiver which is arranged adjacent the laser exit demodulates the emitted radiation and directs it by way of the $f_2$ filter to the control device which changes the resonator length via the first piezoelectric disc as long as the control device receives the frequency $f_2$.

The frequency generator for the control of the second piezoelectric disc is activated, in particular, for the automatic matching only.

BRIEF DESCRIPTION OF THE DRAWINGS

Other objects, features and advantages of the invention, its organization, construction and operation will be best understood from the following detailed description of certain embodiments of the invention taken in conjunction with the accompanying drawings, in which.

DESCRIPTION OF THE PREFERRED EMBODIMENTS

Figure 1:
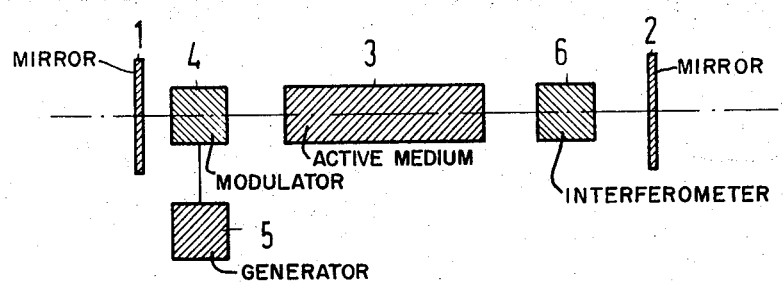
FIG. 1 is a schematic representation of the basic structure of the invention.

FIG. 1 illustrates a laser arrangement comprising a first resonator mirror 1, a second resonator mirror 2, an active laser medium 3, a modulator 4 controlled by a frequency generator 5, and an interferometer 6.

Figure 2:
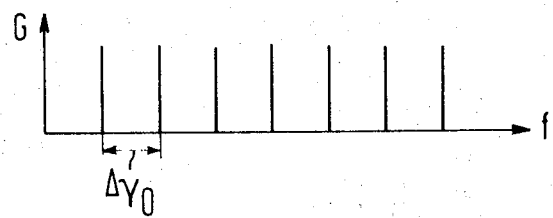
FIGS. 2–5 are pulse line and frequency range diagrams to aid in understanding the invention.

The active medium 3 can be a solid state body medium (e.g., YAG : $Nd^{3+}$) or a gas type medium (e.g., He–Ne), which is enclosed in a laser tube. A population-inversion for the light amplification is created in the active laser medium 3 via a pump light source (not shown). Thereby, laser light is produced in the axial modes of the laser. The frequency spacing of the axial modes amounts to $\Delta\gamma = c/2L$, where c is the speed of light and L is the resonator length. The resulting axial modes in the laser arrangement are as shown in FIG. 2. Their frequencies differ by equal factors in each case and their quality is equal.

Figure 3:
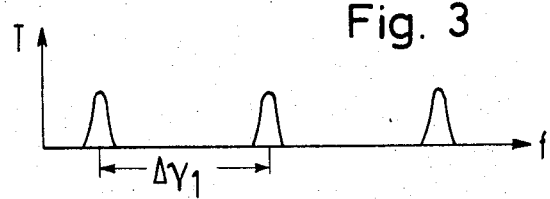
Figure 4:
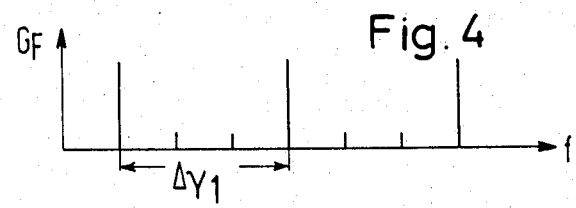
Figure 5:
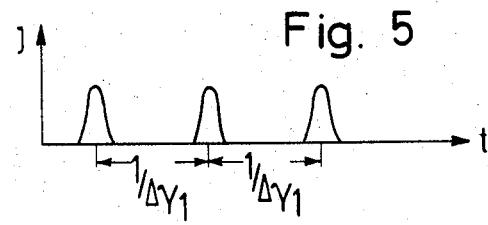

The optical filter 6 of FIG. 1 merely causes the filtering of some modes out of the axial modes, e.g., the second and third modes, the fifth and sixth modes, etc. if the filter has transmission ranges spaced $\Delta\gamma_1$ as is shown in FIG. 3. The frequency spacing $\Delta\gamma_1$ of the transmission ranges is an integral multiple m of the frequency spacing of the axial modes: $\Delta\gamma_1 = mc/2L$. The transmission maxima of the optical filter coincide with the axial modes of the optical resonator at a distance $mc/2L$. The quality of the axial modes thereupon changes as is illustrated in FIG. 4, i.e., the quality for the second, third, fifth, sixth, etc. modes becomes practically zero. Therefore, the laser light is modulated in the modulator 4 in accordance with the frequency spacing $\Delta\gamma_1 = mc/2L$. By the fact that the frequency spacing $\Delta\gamma_1$ has increased, the time distance of the emitted pulses decreases to $71/\Delta\gamma_1$. This is illustrated in FIG. 5 where the intensity of the pulses is shown above the time $t$. This means that the larger the number of filtered modes, the shorter the time between the pulses. If a modulator, which is controlled by the frequency $\Delta\gamma_1 = mc/2L$ is introduced in the laser resonator, a stable pulse with a pulse recurrence frequency of $1/\Delta\gamma_1$ is created.

This stability is maintained, even if many axial modes are lying in the frequency spacing $\Delta\gamma_1$, since it is possible to make the band width of the transmission ranges of the filters smaller than the frequency spacing $c/2L$ of the axial modes of the laser, as will be explained below.

It is of special advantage for the arrangement, according to the present invention, that due to the large possible lengths L of the resonator, longer laser rods or longer gas discharge tubes, respectively, can be utilized as active media and that thereby high initial performances can be achieved with very short pulse spacings.

Figure 6:
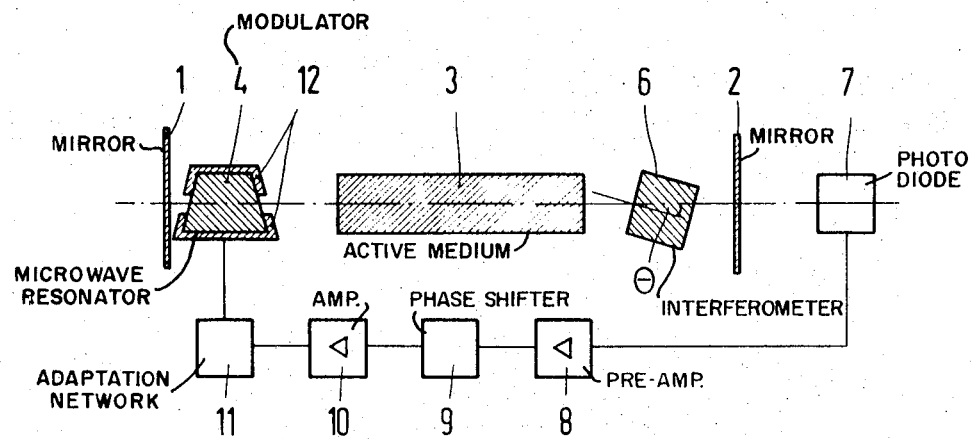
FIG. 6 is a schematic diagram of an embodiment of the invention.

FIG. 6 illustrates a sample embodiment of the invention wherein the active modulator is controlled by the light which is emitted from the laser arrangement. Again in FIG. 6 the arrangement comprises the two resonator mirrors 1 and 2, the active medium 3, the modulator 4 and the optical filter 6 which is arranged at an angle to the incident light beam. Because of the inclination of the optical filter 6, the light which is reflected at the interferometer can not return to the active medium 3 and therefore lead to a disturbing self excitement of the medium. The above mentioned band width of the transmission range depends on the thickness of the interferometer, on the angle of inclination $\theta$ and on the reflection factor R according to the formula:

$$B = 1 - R/2 \; L_I \; n/\cos\theta$$

where B is the band width of the transmission range, R is the reflection factor, $L_I$ is the thickness of the interferometer, n is the index of refraction and $\theta$ is the angle between the refracted beam in the interferometer and the interferometer normal. This means, the band width of the transmission range can be influenced by the application of reflection layers onto the interferometer. The frequency spacing $\Delta\gamma$ of two transmission ranges of the interferometer can be influenced by the angle of inclination $\theta$ according to the formula:

$$\Delta\gamma = c/2n \; L_I \; /\cos\theta.$$

Figure 7:
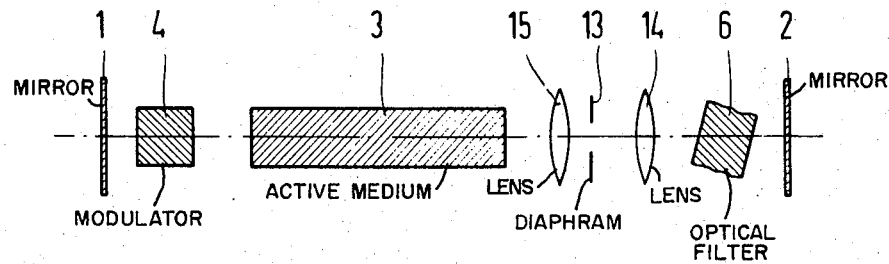
FIG. 7 is a schematic diagram of another embodiment of the invention.

The light which is decoupled from the laser resonator falls onto a photo-diode 7, wherein by means of frequency difference formation between the axial modes in the frequency spacing $\Delta\gamma_1$ a signal of the frequency $\Delta\gamma_1$ is obtained. Thereafter, this signal is directed via a preamplifier 8, a phase shifter 9, a performance amplifier 10 and an adaptation network 11 to the modulator 4. If controlled by high frequencies, the modulator 4 is embedded in a microwave resonator 12. By means of the phase shifter 9, the phase which is favorable for the modulator 4 can be adjusted. This arrangement automatically transforms misalignments of the laser into the respective frequency changes so that the created mode coupling is maintained. The phase modulator 4, e.g., a $LiNbO_3$ crystal includes a light entry window and a light exit window which are inclined at the Brewster angle in order to avoid undesired Etalon effects. If the optical filter 6 is inclined only slightly, there is the danger that the light which is reflected by the filter will return to the active medium 3 and cause undesired self excitement. This danger is eliminated by the embodiment of the invention illustrated in FIG. 7. The active medium 3, the modulator 4 and the optical filter 6 are located in the laser resonator, which is again limited by the resonator mirrors 1 and 2. A filtering optical system comprises a diaphragm 13 which is located at the focal point of two lenses 14 and 15. Since light beams emitting at the edge of the active medium 3 are focused onto the diaphragm, the diaphragm is kept small. Since the focal length of the lens 15 is shorter than the focal length of the lens 14, the beam cross section is widened in the direction toward the optical filter 6, causing a stronger filtering effect.

Figure 8:
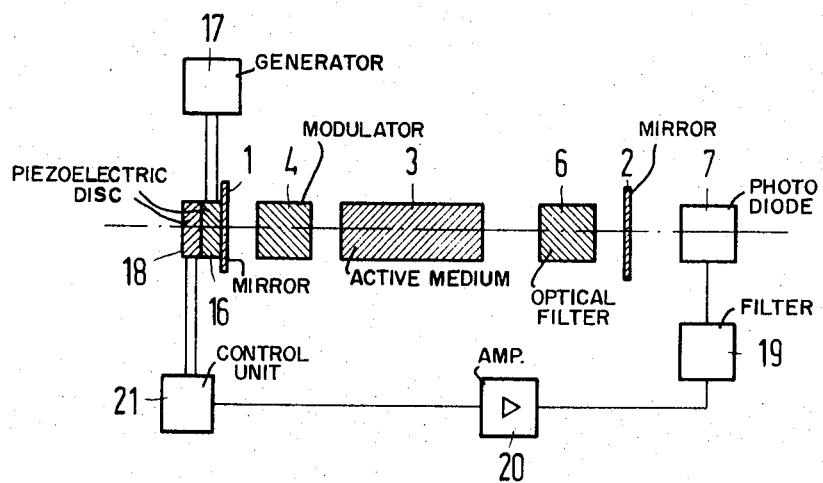
FIG. 8 is a schematic diagram of another embodiment of the invention.

By means of the apparatus illustrated in FIG. 8, the effect of automatic matching frequencies of the axial modes to the maxima of the transmission ranges of the interferometer is shown. Again, the two resonator mirrors 1 and 2, the active medium 3, the modulator 4 and the optical filter 6 are illustrated. A piezoelectric disc 16 is fixed to the resonator mirror 1 and is energized by way of a frequency generator 17 with an alternating voltage having a frequency of, for example, 1kHz. The resonator length is changed with the frequency 1kHz by the oscillations of the piezoelectric disc 16 since the mirror 1 is moved back and forth with an amplitude of approximately λ/10. Therefore, the spectrum of the axial modes with respect to the transmission ranges of the optical filters is shifted, i.e., the axial modes are modulated.

A further piezoelectric disc 18 is fixed to the piezoelectric disc 16 and is energized with a direct voltage for a non-periodic changing of the resonator length. An optical-electrical receiver 7, e.g., a photo-diode or a photo multiplier, is arranged outside of the second resonator mirror 2 to register the modulation frequency of the axial modes and direct them to a filter 19 which passes a frequency of 1kHz. These 1kHz oscillations are directed to a control unit 21 by way of an amplifier 20. The piezoelectric crystal 18 is controlled by the control unit 21 with an increasing direct voltage as long as it receives the 1kHz oscillations. Thereafter, the voltage for the piezoelectric crystal 18 is maintained at a constant level, because the resonator length is arranged in such a way that the frequencies of the axial modes are matched with the maxima of the transmission ranges of the interferometers. This is further explained by means of FIGS. 9 and 10.

Figure 9:
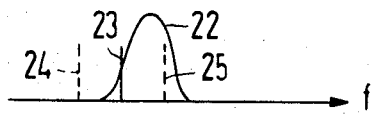
FIGS. 9 and 10 are pulse and frequency range diagrams offered for understanding the invention.
Figure 10:
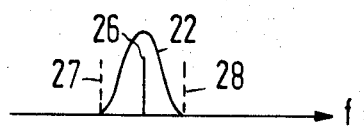

In FIGS. 9 and 10 a transmission band 22 is illustrated on a frequency scale and a mode 23 which does not coincide with the maximum of the transmission band is shown in FIG. 9. Because of the periodic change of the resonator length, the mode 23 oscillates with the frequency 1kHz between the extreme positions 24 and 25, whereby once it falls into the transmission range during the oscillation and once it falls outside of the transmission range. Therefore, the modulation frequency of the mode is also 1kHz.

In FIG. 10, the rest position of the mode 26 coincides with the maximum of the transmission range, whereas the two extreme positions (27 and 28) of the oscillation lie outside of the transmission range. If the resonator length changes again with the frequency 1kHz, a modulation frequency of the mode at 2kHz occurs because it passes through the transmission range twice during each oscillation of the mode.

If, however, the optical-electric receiver 7 illustrated in FIG. 8 receives a modulation frequency of 2kHz, the modulation frequency is not passed on by the 1kHz filter 19 and the control device 21 does not change its voltage for the piezoelectric disc 18. In general, it can be said that the resonator length must be changed if the optical-electric receiver 7 receives a modulation frequency of 1kHz and that the resonator length must be maintained at a constant level if the modulation frequency 2kHz is registered. This task is carried out by the control unit 21 which responds to a 1kHz signal to change the DC voltage applied to the piezoelectric disc 18.

A stable pulse with very short pulse spacings can therefore be created by the foregoing arrangements which, in ddition to an active laser medium and a modulator, contain an optical filter.

Although I have described my invention by reference to a specific illustrative embodiment thereof, many changes and modifications of my invention may become apparent to those skilled in the art without departing from the spirit and scope of the invention. It is therefore to be understood that I intend to include within the patent warranted hereon all such changes and modifications as may reasonably and properly be included within the scope of my contribution to the art.

I claim:

1. A laser arrangement for creating a stable pulse with short pulse spacings, comprising: an optical resonator; an active laser medium disposed in said optical resonator; a modulator disposed within said optical resonator on one side of said active laser medium; and a mode selector disposed within said optical resonator on the other side of said active laser medium, said mode selector including an optical filter for a mode group, said optical filter being an interferometer having transmission ranges with a frequency spacing $\Delta\gamma$ of an integral multiple of the frequency spacing of the axial mode.

2. A laser arrangement according to claim 1, comprising an optical system for filtering the light which is reflected from said interferometer, said optical system arranged between said active laser medium and said interferometer.

3. A laser arrangement according to claim 1, wherein said modulator is a phase modulator operating at a frequency which is greater than $\gamma_1$.

4. A laser arrangement according to claim 1 wherein said modulator is an amplitude modulator operating at a frequency which is greater than $\gamma_1$.

5. A laser arrangement according to claim 1 comprising an external frequency generator connected to and controlling said modulator.

6. A laser arrangement according to claim 1, wherein said modulator is coupled to and controlled by the emitted laser beam.

7. A laser arrangement according to claim 1 wherein said modulator includes light entry and light exit surfaces which are inclined at the Brewster angle.

8. A laser arrangement according to claim 1, comprising means for changing the resonator length for an automatic matching of the frequencies of the axial modes with a maxima of the transmission ranges of the interferometer.

9. A laser arrangement according to claim 8 wherein said optical resonator includes a pair of spaced mirrors, and comprising a first piezoelectric disc secured to one of said mirrors for receiving a direct voltage to effect a non-periodic change of resonator length, a second piezoelectric disc connected to said first piezoelectric disc for receiving an alternating voltage to effect automatic frequency matching of the frequencies of the axial modes with the maxima of the transmission ranges of the interferometer.

10. A laser arrangement according to claim 9 comprising an external frequency generator having a constant frequency connected to said second piezoelectric disc, an optical-electrical receiver disposed outside of said resonator for receiving the laser beam and demodulating the emitted radiation, a filter connected to said optical electrical receiver for passing the frequency of said frequency generator, and a control unit connected between said filter and said first piezoelectric disc for changing the direct voltage applied to said first piezoelectric disc in response to receipt of said frequency via said filter.

* * * * *